United States Patent
Zou et al.

(10) Patent No.: US 8,834,825 B2
(45) Date of Patent: *Sep. 16, 2014

(54) PROCESSES FOR PRODUCING SILANE IN A BUBBLE COLUMN

(75) Inventors: Baisheng Zou, Pearland, TX (US); Puneet Gupta, Houston, TX (US)

(73) Assignee: SunEdison, Inc., St. Peters, MO (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/528,386

(22) Filed: Jun. 20, 2012

(65) Prior Publication Data
US 2013/0004405 A1    Jan. 3, 2013

Related U.S. Application Data

(60) Provisional application No. 61/502,145, filed on Jun. 28, 2011.

(51) Int. Cl.
| | | |
|---|---|---|
| C01B 33/04 | (2006.01) | |
| B01J 10/00 | (2006.01) | |
| B01J 19/00 | (2006.01) | |
| B01J 19/18 | (2006.01) | |

(52) U.S. Cl.
CPC ............. *C01B 33/043* (2013.01); *B01J 10/002* (2013.01); *B01J 2219/00164* (2013.01); *B01J 2219/00186* (2013.01); *B01J 2219/00202* (2013.01); *B01J 19/0066* (2013.01); *B01J 2219/00063* (2013.01); *B01J 2219/00094* (2013.01); *B01J 19/006* (2013.01); *B01J 2219/00777* (2013.01); *B01J 19/18* (2013.01); *B01J 2219/00231* (2013.01); *B01J 19/0013* (2013.01); *B01J 2219/002* (2013.01); *B01J 2219/00159* (2013.01); *B01J 2219/00213* (2013.01)
USPC .......................................... 423/347; 423/645

(58) Field of Classification Search
CPC ....................................................... C01B 33/04
USPC .......................... 423/347, 344, 342, 343, 645
See application file for complete search history.

(56) References Cited

U.S. PATENT DOCUMENTS

| | | | |
|---|---|---|---|
| 4,374,111 A | 2/1983 | Lefrancois | |
| 4,474,743 A | 10/1984 | Marlett | |
| 4,554,141 A | 11/1985 | Scull et al. | |
| 4,632,816 A | 12/1986 | Marlett | |
| 5,075,092 A | 12/1991 | Boone et al. | |
| 5,206,004 A | 4/1993 | Park | |
| 5,211,931 A | 5/1993 | Allen et al. | |
| 8,524,048 B2 * | 9/2013 | Gu et al. | ......... 203/81 |
| 8,529,860 B2 * | 9/2013 | Bhusarapu et al. | ........... 423/341 |
| 8,551,298 B2 * | 10/2013 | Truong et al. | .................... 203/81 |
| 2011/0158882 A1 | 6/2011 | Bhusarapu et al. | |
| 2011/0158896 A1 | 6/2011 | Gupta et al. | |
| 2012/0160702 A1 | 6/2012 | Gupta et al. | |
| 2012/0164033 A1 | 6/2012 | Gupta et al. | |
| 2013/0174605 A1 * | 7/2013 | Zou et al. | ........................ 62/620 |

FOREIGN PATENT DOCUMENTS

WO    2010046751 A2    4/2010

OTHER PUBLICATIONS

PCT International Search Report and Written Opinion of the International Searching Authority mailed on Jan. 23, 2013 regarding PCT/US2012/043302 filed on Jun. 20, 2012.
Perry et al., "Gas/Liquid Reactions" Perry's Chemical Engineers' Handbook, 23-49, 1 page (1997).
PCT Invitation to Pay Additional Fees and, Where Applicable, Protest Fee mailed on Oct. 1, 2012 regarding PCT/US2012/043302 filed on Jun. 20, 2011; 8 pages.
N.V. Stepanenko, et al., Evaluation of the Thermophysical Characteristics of a Bubbling-Type Reactor on Transformation of Silicon Tetrafluoride into Monosilane, Journal of Engineering Physics and Thermophysics, 2002, vol. 75, No. 6, pp. 1319-1322.

* cited by examiner

*Primary Examiner* — Edward Johnson
(74) *Attorney, Agent, or Firm* — Armstrong Teasdale LLP

(57) ABSTRACT

Methods for producing silane by reacting a hydride and a halosilane are disclosed. Some embodiments involve use of a column which is not mechanically agitated and in which reactants may be introduced in a counter-current arrangement. Some embodiments involve use of a baffled column which has multiple reaction zones.

49 Claims, 3 Drawing Sheets

PROCESSES FOR PRODUCING SILANE IN A BUBBLE COLUMN

CROSS-REFERENCE TO RELATED APPLICATION

This application claims the benefit of U.S. Provisional Patent Application No. 61/502,145, filed Jun. 28, 2011, which is incorporated herein by reference.

BACKGROUND

The field of the present disclosure relates to methods for producing silane and, particularly, methods which include use of columnar reactors in which a feed gas and hydride feed are introduced. Some particular embodiments are directed to methods which involve reacting a halosilane (e.g., a silicon tetrahalide gas such as $SiF_4$) and a hydride (e.g., an alkali or alkaline earth-metal salt of aluminum hydride such as $NaAlH_4$) to produce silane.

Silane is a versatile compound that has many industrial uses. In the semiconductor industry, silane may be utilized for deposition of an epitaxial silicon layer on semiconductor wafers and for production of polycrystalline silicon. Polycrystalline silicon is a vital raw material used to produce many commercial products including, for example, integrated circuits and photovoltaic (i.e., solar) cells that may be produced by thermal decomposition of silane onto silicon particles in a fluidized bed reactor.

Silane may be produced by reacting silicon tetrafluoride with an alkali or alkaline earth metal aluminum hydride such as sodium aluminum tetrahydride as disclosed in U.S. Pat. Nos. 4,632,816 and 5,075,092, both of which are incorporated herein by reference for all relevant and consistent purposes. This process is characterized by high energy efficiency; however, starting material costs can negatively influence the economics of such a system.

A continuing need therefore exists for economical methods for producing silane and for methods that may relatively improve reactor productivity and conversion of the various reactants.

SUMMARY

One aspect of the present disclosure is directed to a process for preparing silane in a columnar reaction vessel. The vessel includes a lower inlet, a lower outlet, an upper inlet and an upper outlet and includes a reaction mixture within the vessel. A hydride feed comprising a hydride is introduced into the upper inlet of the reaction vessel. A feed gas comprising a halosilane is introduced into the lower inlet of the reaction vessel to bubble the feed gas through the reaction mixture. The hydride reacts with the halosilane to produce silane and a halide salt. A product gas comprising silane is discharged from the upper outlet. An effluent comprising the halide salt is discharged from the lower outlet.

Another aspect of the present disclosure is directed to a process for preparing silane in a reaction vessel having a reaction mixture within the vessel. The vessel has one or more baffles which create two or more reaction zones connected in series. A hydride feed comprising a hydride is introduced into the reaction vessel. A feed gas comprising a halosilane is introduced into the reaction vessel to bubble the feed gas through the reaction mixture. The hydride reacts with the halosilane to produce silane and a halide salt. A product gas comprising silane is discharged from the reaction vessel. An effluent comprising the halide salt is discharged from the reaction vessel. The reaction mixture is agitated.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

In accordance with embodiments of the present disclosure, silane is produced by reacting a halide (e.g., $NaAlH_4$) with a halosilane (e.g., $SiF_4$) in a columnar reaction vessel which is commonly referred to in the art as a "bubble column." In some embodiments, the reactants are introduced into the reaction vessel in a counter-current relationship and, optionally, the column is operated in a manner (e.g., no mechanical agitation) such that the reaction vessel substantially acts as a plug-flow reactor with respect to the gas phase. Alternatively or in addition, the reaction vessel is baffled so as to create two or more reaction zones within the reaction vessel. In some embodiments, one or more of the reaction zones are agitated such that the reactor acts as a number of continuously-stirred tank reactors connected in series. Optionally, one or more of the reaction zones may be cooled and heat transfer may be controlled independent of other reaction zones. Further, the temperature of one of the zones (or temperature rise across the zone) may be monitored to determine conversion of reactants and to adjust the respective flow rates of reactants. Control schemes based on such temperature changes in the reaction zone allow conversion of reactants to be maximized without direct measurement of product or reactant concentrations. Unlike direct measurement of reactant or product concentrations which may require specialized technicians or laboratory personnel, temperature measurement (and resulting control) may be made on a continuous basis and may be transmitted nearly instantaneously to operators or to automated control processors.

Figure 1:
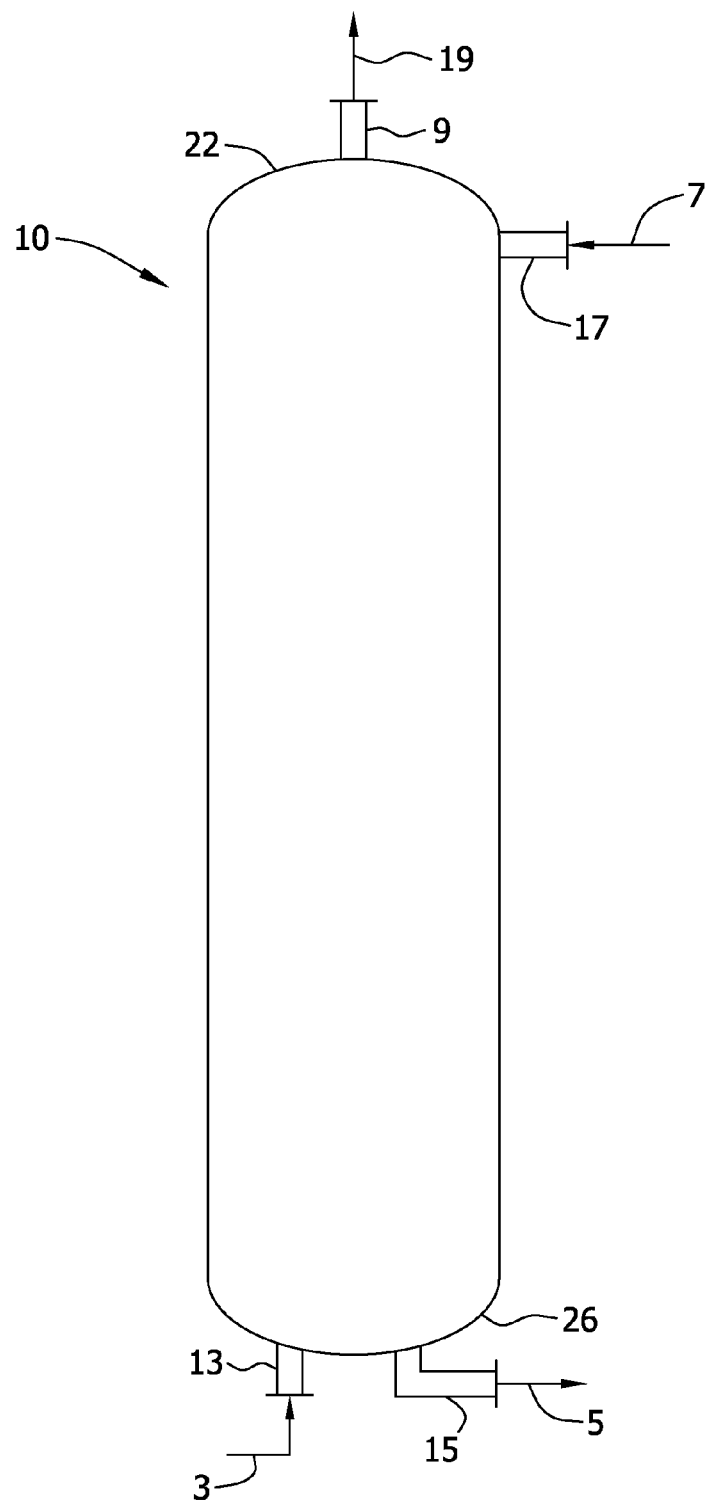
FIG. 1 is a schematic of a reaction vessel for producing silane which shows reactant and product flows to and from the reaction vessel.

Referring now to FIG. 1, a hydride feed 7 is introduced into an upper inlet 17 of a reaction vessel 10 (synonymously "reactor"). The feed 7 includes one or more hydride compounds such as an alkali or alkaline earth-metal hydride (e.g., NaH) or alkali or alkaline earth metal salt of aluminum tetrahydride (e.g., $NaAlH_4$). As used herein, a "hydride" contains an alkali or alkaline earth metal and hydrogen and may also include alkali or alkaline earth metal salts of aluminum hydride. Halide salts may have the general formula $MH_y$ when they do not contain aluminum or the general formula M(AlH$_4$)$_y$, when they do contain aluminum, wherein M is an alkali or alkaline earth metal and y is 1 when M is an alkali and y is 2 when M is an alkaline earth metal. The alkali or alkaline earth-metal of the hydride (and of the resulting alkali or alkaline salt by-product described below) may be selected from the group consisting of lithium, sodium, potassium, magnesium, barium, calcium and mixtures thereof. In view of the wide availability of sodium hydrides (e.g., NaH and NAlH$_4$), sodium is a preferred alkali or alkaline earth metal. In this regard, it should be understood that any alkali or alkaline earth metal may be used in accordance with the present disclosure. Alkali or alkaline earth metal hydrides and alkali or alkaline earth-metal salts of aluminum tetrahydride may be produced by reacting their elemental precursors (e.g., Na, Al and H) under high pressure and temperature.

The hydride feed 7 typically includes a solvent therein such as one or more polyethers, hydrocarbons or mixtures thereof. Suitable polyethers include diglyme, monoglyme, dioxane and mixtures thereof and suitable hydrocarbons include toluene, pentane and mixtures thereof. Typically the hydride is dissolved in the solvent, however in some embodiments, the hydride feed solution includes solid hydride that is slurried in the reaction solution. In this regard, the term "solution" as used herein (in regard to the hydride feed solution as well as other "solutions" described below) is not intended to be limited to only liquid mixtures in which all components are dissolved in a solvent and includes liquid mixtures in which a solid is slurried in the liquid (e.g., such as in a sluice-type system) or even which contains two liquids that are partially or even fully immiscible. Similarly, the effluent described below may contain salt that is partially or wholly dissolved therein and may contain salt that is slurried in the effluent.

The concentration of hydride in the solvent of the hydride feed 7 may vary and, in embodiments wherein the hydride is dissolved in the solvent, the concentration is preferably less than the solubility limit of the hydride in the chosen solvent. However, the concentration should be maintained at a relatively high concentration such that a commercially practical reaction vessel size may be used. In various embodiments, the concentration of hydride may be at least about 3%, at least about 5%, at least about 7% or even at least about 10%. In these and in other embodiments the concentration may be less than about 15%, less than about 13% or less than about 11%. The concentration may be bound by any combination of the above noted parameters (e.g., from about 5% to about 13%). It should be noted that the particular concentration selected for use may vary depending on the particular solvent and hydride as well as the temperature of the feed 7. The temperature of the hydride feed 7 may also vary and, typically, heating or cooling of the hydride feed prior to entry into the reaction vessel 10 is not required (e.g., the hydride feed may be introduced at about room temperature). However, in some embodiments, it is preferred to cool the hydride feed (e.g., to about 20° C. as with hydride feeds containing NaAlH$_4$) to allow the hydride to absorb unreacted halosilane (e.g., SiF$_4$) from the product gas.

In some embodiments, the hydride feed 7 is a solid which is metered into the reaction vessel. In these embodiments, a liquid feed which includes a solvent (e.g., a reaction medium in which the reaction takes place) is introduced into the reaction vessel 10 and the solvent and hydride mix within the reaction vessel (e.g., by the bubble action of the gas therein as described below).

A halosilane feed gas 3 is introduced into the reaction vessel 10 through a lower inlet 13. A sparger may be used to help distribute the gas 3 into the reaction mixture or the gas may be introduced into the vessel by any other method available to those of skill in the art (e.g., nozzles). The feed gas 3 includes a gas selected from silicon tetrahalide (e.g., SiF$_4$), trihalosilane (e.g., SiHCl$_3$), dihalosilane or monohalosilane. In this regard, some halosilanes are liquids at room temperature and, in embodiments wherein such a halosilane is used in the feed gas, the feed gas may be at a temperature above room temperature and typically will be at a temperature above the boiling point of the halosilane chosen for use. Generally any halogen may be used (e.g., fluorine, chlorine, bromine or iodine) with fluorine being a preferred halogen as the resulting by-product fluoride salt is less likely to form complexes with the solvent compared to other halogens. In some embodiments, the halosilane is silicon tetrahalide (e.g., SiF$_4$). In these and in other embodiments, the hydride that is introduced into the reaction vessel 10 within the hydride feed 7 may be an alkali or alkaline earth metal salt of aluminum tetrahydride (e.g., NaAlH$_4$).

It should be noted that a portion (e.g., up to 75%) of the feed gas 3 may be introduced into the reaction vessel 10 at a point other than the lower inlet 13 which may help in reduction of competing by-product reactions and an improvement in selectivity towards silane. In some embodiments, a portion of the feed gas is introduced in a reaction zone of the vessel 10 above the lowest reaction zone (e.g., intermediate reaction zone which is described below).

Generally, the feed gas 3 and hydride feed 7 (e.g., feed solution) may be introduced into the reaction vessel 10 at room temperature; however the temperature of the feed gas 3 should be maintained above a minimum temperature at which the halosilane remains as a gas. Further, the temperature of the feed gas 3 and hydride feed 7 may vary within commercially practical limits and heating and cooling of the feed gas 3 and hydride feed 7 is generally not needed. In some embodiments and in particular embodiments in which the feed gas 3 comprises SiF$_4$, the feed gas 3 may generally be introduced at a temperature of from about 20° C. to about 100° C. In some embodiments and in particular embodiments wherein the hydride feed comprises NaAlH$_4$, the hydride feed 7 may be introduced at a temperature of at least about 15° C. (e.g., from about 15° C. to about 55° C.). The reaction vessel 10 may be operated at atmospheric pressure or may be pressurized (e.g., from about 0 to about 300 Kpa).

It is preferred that the halosilane and hydride be introduced into the reaction vessel 10 at about their stochiometric ratio (e.g., about a 1:1 molar ratio as when NaAlH$_4$ and SiF$_4$ are used as reactants as shown in reaction 3i below) such that all reactants are consumed; however an excess of the halosilane or hydride may be used without departing from the scope of the present disclosure. In some embodiments in which an excess of one reactant is used, the excess of such reactant may be less than about 20% of the stochiometric amount of that reactant or less than about 10%, less than about 5% or less than about 2%.

The halosilane in the feed gas 3 reacts with the hydride in the reaction mixture (which may be dissolved in the liquid or may be a solid depending on the hydride chose for use) to form silane and a halide salt. In embodiments wherein the hydride is an alkali or alkaline earth-metal halide and the halosilane feed gas includes silicon tetrahalide, the reaction may proceed according to reaction (1) below and in embodiments wherein the hydride is an alkali or alkaline earth-metal halide the feed gas includes a trihalosilane compound it may proceed according to reaction (2) below:

$$(4/y)MH_y + SiX_4 \rightarrow (4/y)MX_y + SiH_4 \qquad (1)$$

$$3MH_y + ySiHX_3 \rightarrow 3MX_y + ySiH_4 \qquad (2)$$

wherein X is a halogen, M is an alkali or alkaline earth-metal, y is 1 when M is an alkali and y is 2 when M is an alkaline earth metal. For instance, when M is Na and X is F, the reactions proceed as follows, $$4NaH + SiF_4 \rightarrow 4NaF + SiH_4 \quad (1i)$$

$$3NaH + SiHF_3 \rightarrow 3NaF + SiH_4 \quad (2i)$$

When M is Ba and X is F, the reactions proceed as follows, $$2BaH_2 + SiF_4 \rightarrow 2BaF_2 + SiH_4 \quad (1ii)$$

$$3BaH_2 + 2SiHF_3 \rightarrow 3BaF_2 + 2SiH_4 \quad (2ii)$$

In embodiments wherein an alkali or alkaline earth metal salt of aluminum hydride is used, the respective reactions may proceed according to reactions (3) and (4) shown below:

$$M(AlH_4)_y + YSiX_4 \rightarrow M(AlX_4)_y + YSiH_4 \quad (3),$$

$$3M(AlH_4)_y + (4Y)SiHX_3 \rightarrow 3M(AlX_4)_y + (4Y)SiH_4 \quad (4).$$

wherein y is 1 when M is an alkali and y is 2 when M is an alkaline earth metal. For instance, when M is Na and X is F, the reactions proceed as follows, $$NaAlH_4 + SiF_4 \rightarrow NaAlF_4 + SiH_4 \quad (3i),$$

$$3NaAlH_4 + 4SiHF_3 \rightarrow 3NaAlF_4 + 4SiH_4 \quad (4i).$$

When M is Ba and X is F, the reactions proceed as follows, $$Ba(AlH_4)_2 + 2SiF_4 \rightarrow Ba(AlF_4)_2 + 2SiH_4 \quad (3ii),$$

$$3Ba(AlH_4)_2 + 8SiHF_3 \rightarrow 3Ba(AlF_4)_2 + 8SiH_4 \quad (4ii).$$

Silane gas is generated in the reaction vessel 10 and this gas may be withdrawn from an upper outlet 9 of the vessel as a product gas 19. The liquid level in the vessel 10 is generally maintained at a level below the inlet 17 such that a gas disengagement zone forms above the inlet 17 which allow product gas 19 to separate from the liquid. In addition to silane gas, a halide salt (e.g., NaF or NaAlF_4) is produced in the vessel 10 which may be discharged through a lower outlet 15 in an effluent 5. The halide salt may be a solid which is slurried (and may be partially dissolved) in the effluent 5 or may be wholly dissolved depending the effluent temperature and the halide salt that is produced. Generally, the feed gas 3 and hydride feed 7 are introduced into the reaction vessel 10 in a continuous manner and the silane-containing product gas 19 and effluent 5 are withdrawn continuously from the vessel 10. It should be noted that use of the terms "continuous" and "continuously" herein imply that each of the respective reactants (i.e., feed gas and hydride feed) and products (i.e., product gas and effluent) are introduced and withdrawn contemporaneously with respect to the other reactants and products.

It should be further noted that the terms "inlet" and "outlet" as used herein generally refer to an opening in the reaction vessel 10 through which fluid (e.g., flowable solid, liquid or gas) is transmitted and should not be considered in a limiting sense. As used herein, an "inlet" or "outlet" includes, for example, a flanged inlet or outlet through which appropriate source piping is attached and also includes openings in the wall of the reaction vessel to which source piping may be directly attached (e.g., by welding). Further, the lower inlet through which a halosilane is introduced may be the outlet or outlets of a gas sparger used to distribute the gas or the outlets of one or more nozzles.

It should also be noted that, as used herein, the term "lower" as used in the "lower inlet 13" or "lower outlet 15" is intended to denote an outlet or inlet that is generally closer to the bottom end 26 of the reaction vessel 10 relative to the upper inlet 17 and upper outlet 9 (i.e., is closer to the ground which allows for gas to bubble upward in the reaction vessel after introduction through inlet 13). Similarly, use of the term "upper" as in "upper inlet 17" or "upper outlet 9" denotes an inlet or outlet that is more near the top end 22 of the reaction vessel 10 relative to the lower inlet 13 and lower outlet 15.

The reaction vessel 10 is typically a columnar reaction vessel (i.e., has a height which exceeds the width of the vessel); however, the vessel 10 need not be cylindrical. In some embodiments, the vessel 10 is cylindrical and has a diameter D that extends from the center of the vessel to the vessel wall. The ratio of the height of the vessel to its diameter may be at least about 4, at least about 8 or even at least about 10 (e.g., from about 4 to about 10).

In some embodiments, the reaction vessel of FIG. 1 is not mechanically agitated. The reaction mixture may be agitated by "bubble action" of the gas within the reaction mixture as the gas rises to the upper portions of the reaction vessel 10. Such "bubble action" helps provide radial uniformity of the reactor contents. As used herein "mechanical" agitation refers to agitation that is created by use of any means other than the bubble-action of the gas within the reaction mixture.

By introducing the feed gas 3 and hydride feed 7 into the reaction vessel 10 in a counter-current relationship such that the gas bubbles upward through the reaction mixture, conversion of the hydride and halosilane may be increased relative to conventional reaction systems. Generally, from the perspective of the gaseous components, the reaction between the halide and the halosilane gas is performed under conditions that approach ideal counter current plug flow, however it should be understood that the present disclosure is not limited to plug flow conditions or conditions that approach or approximate plug flow. Liquid components typically do not behave in an ideal plug flow manner, as liquid components may recirculate locally within the reaction vessel. In accordance with embodiments of the present disclosure, the desired reaction conversion may be achieved within one reaction vessel (i.e., bubble columns) rather than in a plurality of vessels. It should be understood however that multiple reaction vessels (i.e., bubble columns) may be used (e.g., in series or in parallel) without departing from the scope of the present disclosure and, as in some embodiments, the reaction vessel 10 may be operated in a co-current arrangement or in a partially counter-current manner.

In preferred embodiments, the reaction vessel 10 is operated in a counter-current manner as counter-current flow of reactants and products helps prevent gelling of the reaction mixture. In such embodiments, it is preferred that one or more baffles 30 are incorporated into the column. The liquid phase in a bubble column without one or more baffles and agitation may form a recirculation pattern in which liquid flows downward near the wall and liquid is forced upward by the flow of gas in the center of the vessel. The baffles 30 and mechanical agitation interrupt upward flow of the liquid components and the reaction vessel more closely approximates counter-current plug flow than embodiments in which no baffles are used.

Typically a catalyst is not used to promote the reaction between the halide and halosilane, however in some embodiments, an amount of catalyst such as, for example, tri-ethyl aluminum, various lewis acids or trace alkali metals (e.g., impurity lewis acids such as metal chlorides) may be added to the reaction vessel 10. Such catalysts reduce the temperature at which reactions (1)-(4) achieve sufficient conversion. In embodiments wherein a catalyst is not employed, the reaction vessel may be operated at temperatures of at least about 120° C. (e.g., from about 120° C. to about 225° C. or from about 140° C. to about 200° C.); whereas, in embodiments wherein a catalyst is used, the reaction vessel may be operated at a relatively cooler temperature of at least about room temperature (about 25° C.) (e.g., from about 25° C. to about 125° C., from about 40° C. to about 100° C. or from about 40° C. to about 60° C.). In this regard, it should be noted that the temperature of the reaction mixture typically varies along the length of the reaction vessel 10 and that the recited temperatures are only exemplary and should not be considered in a limiting sense.

The average residence time for liquid materials added to the reaction vessel 10 may be from about 5 minutes to about 60 minutes and residence time for gas (e.g., gas bubbles which change composition as they ascend the reaction vessel) may be from about 5 to about 30 seconds.

The product gas 19 withdrawn from the vessel 10 may be relatively pure (e.g., contain less than about 5 vol % or even less than about 2 vol % compounds other than silane). After the product gas 19 is removed from the reaction vessel 10, the product gas 19 may be subjected to further processing. For example, the gas 19 may be purified (e.g., to remove compounds such as boron halides or phosphorous halides) by introduction into one or more distillation columns and/or molecular sieves to remove impurities as disclosed in U.S. Pat. No. 5,211,931, U.S. Pat. No. 4,554,141 or U.S. Pat. No. 5,206,004, each of which is incorporated herein by reference for all relevant and consistent purposes, or by any of the other known method available to those of skill in the art.

The product gas 19 may be used to prepare polycrystalline silicon (e.g., granular or chunk polycrystalline silicon) or may be used to prepare one or more epitaxial layers on silicon wafers. Silane may be stored and/or transported before use as appreciated by those of skill in the art.

It should be noted that the reaction mixture that is within the reaction vessel 10 may include gas phase, liquid phase and/or solid phase components and that the composition of the reaction mixture varies along the length (i.e., height) of the vessel. Accordingly, use of the phrase "reaction mixture" as used herein should not be considered in a limiting sense.

In some embodiments of the present disclosure, conversion of the hydride (e.g., $NaAlH_4$) in the reaction vessel 10 is at least about 80%. In some embodiments, the conversion of hydride is at least about 85%, at least about 90%, at least about 95%, at least about 99%, at least about 99.9% or even about 100%. In these and in other embodiments, the conversion of the halosilane (e.g., $SiF_4$) in the reaction vessel 10 may be at least about 80%, at least about 85%, at least about 90%, at least about 95%, at least about 99%, at least about 99.9% or even about 100%.

Figure 2:
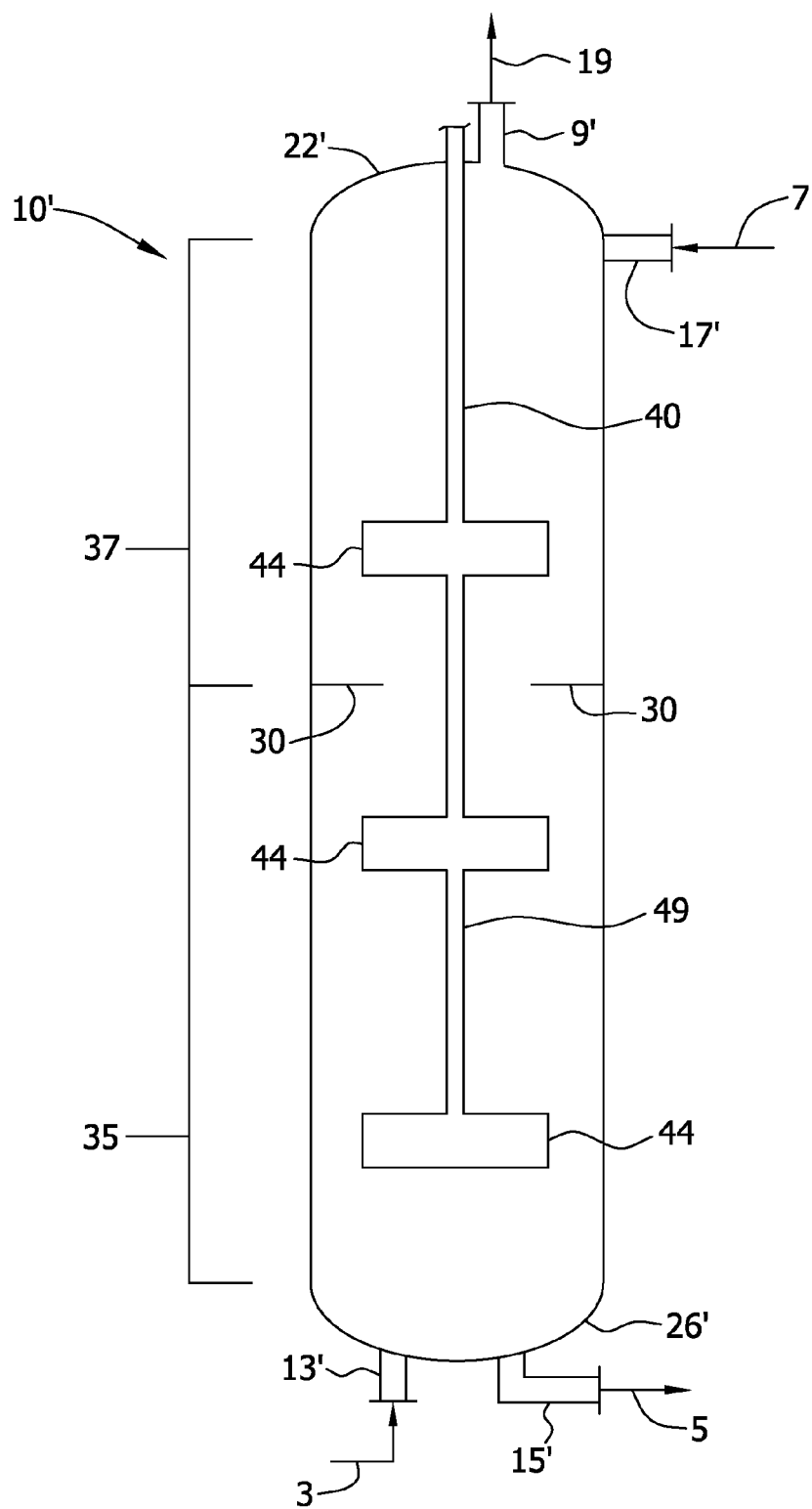
FIG. 2 is a schematic of a reaction vessel having two reaction zones for producing silane which shows reactant and product flows to and from the reaction vessel.
Figure 3:
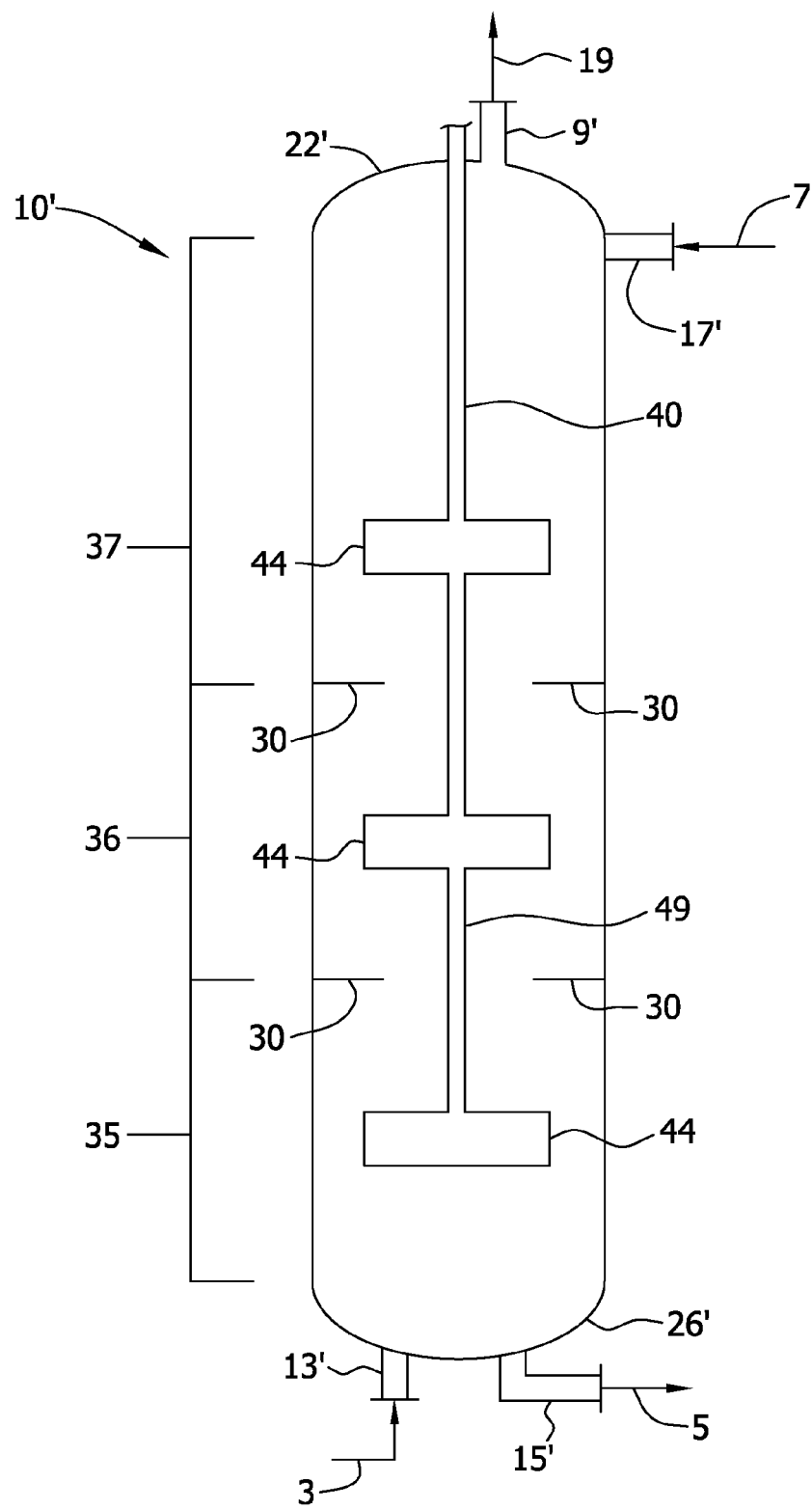
FIG. 3 is a schematic of a reaction vessel having three reaction zones for producing silane which shows reactant and product flows to and from the reaction vessel.

In some embodiments of the present disclosure and as shown in FIGS. 2 and 3, the reaction vessel 10' contains one or more baffles 30 which define two or more reactions zones connected in series. As shown in FIG. 2, the reaction vessel 10' contains a single baffle 30 which divides the vessel 10' into an upper reaction zone 37 and a lower reaction zone 35 and the reaction vessel 10' of FIG. 3 contains two baffles 30 which divide the vessel into a lower reaction zone 35, an intermediate reaction zone 36 and upper reaction zone 37. It should be understood that the vessel may have additional baffles and reaction zones without limitation. In this regard, the reaction conditions in reaction zones which are agitated generally approach that of a continuously ideally-stirred tank reactor (CSTR) such that the reaction vessel acts as a number of CSTR's. When two or more adjacent reaction zones are agitated, the adjacent zones act as a number of CSTR's operated in series.

The baffles 30 may take any of a variety of shapes without departing from the scope of the present disclosure. In some embodiments, such as embodiments wherein the vessel 10' is cylindrical, the baffles 30 may be annular. The baffles should be sized such that they provide sufficient separation between zones while achieving sufficient flow without an acceptable amount of pressure loss.

The feed gas 3, product gas 19, hydride feed 7 and effluent 5 may be introduced or withdrawn from the reaction vessel 10' in the same arrangement (i.e., arrangement of inlets and outlets) shown in FIG. 1, however other arrangements may be used without limitation.

As shown in FIGS. 2 and 3, the reaction mixture is mixed by use of a mechanical agitator 40. The agitator 40 may be an impeller-type agitator having a shaft 49 and a number of blades 44. As shown in FIGS. 2 and 3, each reaction zone has at least one blade 44 within the reaction zone; however it should be noted that some zones may not contain blades without limitation. Generally the mechanical agitator 40 only mixes zones which contain a blade therein. It should be noted that one or more zones may contain more than one blade therein as shown in the lower reaction zone of FIG. 2 without limitation. The blades 44 may take a variety of shapes and the rectangular blade shape shown in FIG. 2 should not be considered limiting. Further, mechanical agitators other than blade agitators (e.g., ribbon agitators) may be used without limitation. In some embodiments, a mechanical agitator is not used and the reaction zones are mixed by the bubble action of the gas within the reaction mixture.

In this regard, the reaction mixture within the reaction zones of the reaction vessel 10' may generally be at different temperatures. Reactions (1)-(4) are exothermic reactions and the majority of heat is generated in the upper reaction zones (typically the top reaction zone) which contain the highest composition of hydride solution. The reaction mixture in one or more of the reaction zones may be cooled (e.g., by water jacketing or by any other method for cooling available and suitable to those of skill in the art). For instance in some embodiments, the upper reaction zones 37 of the vessel 10' of FIGS. 2 and 3 may be cooled (and optionally the intermediate reaction zone 36 of FIG. 3). Mixtures of silane and vapors from some solvents may be explosive and cooling the upper reaction zones advantageously reduces the vapor pressure of the solvent and the likelihood of explosion. Optionally, the lower reaction zone 35 is not cooled.

In some embodiments, the temperature of the reaction mixture (e.g., the temperature in one or more reaction zones) may be monitored to determine if sufficient conversion of reactants is occurring (e.g., to determine if the reaction is at or is approaching completion). For instance, the temperature of the reaction mixture in the lower reaction zone 35 (which is typically operated under adiabatic conditions) may be monitored. The temperature, $T_{100}$, of the reaction mixture in the lower reaction zone 35 at which 100% conversion is achieved based on the respective reactant flow rates and starting temperatures may be determined (e.g., by previous modeling). In cases in which $T_{100}$ is not achieved or in which the temperature is not within an acceptable range from $T_{100}$, the flow rates may be lowered to increase conversion which results in a temperature increase. Similarly, if $T_{100}$ is achieved (or a temperature in an acceptable range from $T_{100}$) in the lower reaction zone 35, one or both of the reactant flow rates may be increased up to the point at which $T_{100}$ is not achieved (or in which the temperature falls outside of an acceptable range from $T_{100}$).

Alternatively or in addition, the temperature rise in the lower reaction zone 35 (e.g., the increase in temperature from the intermediate reaction zone 36 to the lower reaction zone 35) may be monitored. In acceptable temperature rise $T_A$ in this bottom reaction zone 35 may be determined (e.g., at least about 5° C. increase, at least about 10° C. increase $T_A$ or at least about 15° C. increase) and, if the acceptable temperature increase is not achieved, the flow of one or more the reactants may be adjusted (e.g., flows increased if the desired temperature is not reached). In regard to adjustments to the reactant flow rates, it is preferred that the halosilane and hydride be introduced into the reaction vessel 10' in a stochiometric ratio such that all reactants are consumed; however an excess of the halosilane or hydride may be used without departing from the scope of the present disclosure.

One or more embodiments of the present disclosure for forming silane by reacting a halosilane and a hydride in a reaction vessel as disclosed may be incorporated into a larger process system for producing polycrystalline silicon. For example, silane as produced according to one or more embodiments of the present disclosure may be introduced into a fluidized bed reactor with granular polycrystalline fluidized therein to thermally decompose silane and deposit silicon on the particles according to any the methods available to those of skill in the art for performing such a process. Alternatively, the silane may be introduced into a so-called Siemens reactor to deposit silicon onto heated rods according to any the methods available to those of skill in the art for performing such a Siemens process.

A process for producing silane according to one of the embodiments of the present disclosure may be used for operation of the silane reactor which forms part of a process for producing silane from alkali or alkaline earth metal halide salt by electrolysis as described in U.S. patent application Ser. No. 12/978,209 entitled "Methods for Producing Silane," filed Dec. 23, 2010 which is incorporated herein by reference for all relevant and consistent purposes. Alternatively or in addition, the halide salt that is produced (e.g., alkali or alkaline earth metal salt of an aluminum halide such as $NaAlF_4$) may be contacted with an acid in the absence of silicon to produce aluminum trifluoride as described in U.S. patent application Ser. No. 12/969,058, entitled "Methods for Producing Aluminum Trifluoride," filed Dec. 15, 2010 or may be contacted with an acid in the presence of silicon to produce silicon tetrafluoride as described in U.S. patent application Ser. No. 12/969,089, entitled "Methods for Producing Silicon Tetrafluoride," filed Dec. 15, 2010, both of which are incorporated herein by reference for all relevant and consistent purposes.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A process for preparing silane in a columnar reaction vessel, the vessel comprising a lower inlet, a lower outlet, an upper inlet and an upper outlet and having a reaction mixture therein, the process comprising:
   introducing a hydride feed comprising a hydride into the upper inlet of the reaction vessel;
   introducing a feed gas comprising a halosilane into the lower inlet of the reaction vessel to bubble the feed gas through the reaction mixture, the hydride reacting with the halosilane to produce silane and a halide salt;
   discharging a product gas comprising silane from the upper outlet; and
   discharging an effluent comprising the halide salt from the lower outlet, the reaction vessel not being mechanically agitated while reacting the hydride with halosilane.

2. The process as set forth in claim 1 wherein the hydride is selected from the group consisting of alkali or alkaline earth metal hydrides, alkali or alkaline earth metal salts of aluminum tetrahydride, and combinations thereof.

3. The process as set forth in claim 1 wherein the halosilane is selected from the group consisting of silicon tetrahalide, trihalosilane, dihalosilane, monohalosilane and combinations thereof.

4. The process as set forth in claim 1 wherein the hydride is an alkali or alkaline earth metal salt of aluminum tetrahydride, the halosilane is silicon tetrahalide and the halide salt is an alkali or alkaline earth-metal salt of aluminum tetrahalide.

5. The process as set forth in claim 1 wherein the hydride is the sodium salt of aluminum tetrahydride, the halosilane is silicon tetrafluoride and the halide salt is the sodium salt of aluminum tetrafluoride.

6. The process as set forth in claim 1 wherein the discharged effluent is a slurry.

7. The process as set forth in claim 1 wherein the hydride feed and feed gas are introduced continuously into the reaction vessel and the product gas and effluent are discharged continuously from the reaction vessel.

8. The process as set forth in claim 1 wherein the hydride feed is a solution that comprises a solvent and a hydride.

9. The process as set forth in claim 8 wherein the solvent is selected from the group consisting of polyethers, hydrocarbons and mixtures thereof.

10. The process as set forth in claim 9 wherein the polyethers are selected from the group consisting of diglyme, monoglyme, dioxane and mixtures thereof and the hydrocarbons are selected from toluene, pentane and mixtures thereof.

11. The process as set forth in claim 1 wherein the hydride feed comprises solid hydride.

12. The process as set forth in claim 1 wherein the conversion of the hydride is at least about 80%.

13. The process as set forth in claim 1 wherein the conversion of the hydride is at least about 80%.

14. The process as set forth in claim 1 wherein the conversion of the halosilane is at least about 80%.

15. The process as set forth in claim 1 wherein the conversion of the halosilane is at least about 80%.

16. A process for preparing silane in a reaction vessel having a reaction mixture therein, the vessel having one or more baffles, the baffles creating two or more reaction zones connected in series, the process comprising:
   introducing a hydride feed comprising a hydride into the reaction vessel;
   introducing a feed gas comprising a halosilane into the reaction vessel to bubble the feed gas through the reaction mixture, the hydride reacting with the halosilane to produce silane and a halide salt;
   discharging a product gas comprising silane from the reaction vessel;
   discharging an effluent comprising the halide salt from the reaction vessel; and
   agitating the reaction mixture.

17. The process as set forth in claim 16 wherein a mechanical agitator is disposed within the reaction vessel.

18. The process as set forth in claim 17 wherein the agitator agitates the contents of one or more reaction zones of the vessel, the reaction between the hydride and halosilane in each agitated reaction zone being performed under conditions that approach a continuously ideally-stirred tank reactor.

19. The process as set forth in claim 17 wherein the mechanical agitator is an impeller having one or more blades disposed within each agitated reaction zone.

20. The process as set forth in claim 17 wherein each reaction zone of the reaction vessel is agitated.

21. The process as set forth in claim 16 wherein the vessel comprises an upper inlet in which the hydride feed is introduced, a lower inlet in which the feed gas is introduced, an upper outlet from which the product gas is discharged and a lower outlet from which the effluent is discharged.

22. The process as set forth in claim 16 wherein the hydride feed and feed gas are introduced continuously into the reaction vessel and the product gas and effluent are discharged continuously from the reaction vessel.

23. The process as set forth in claim 16 wherein the hydride feed is a solution that comprises a solvent and a hydride.

24. The process as set forth in claim 23 wherein solvent is selected from the group consisting of polyethers, hydrocarbons and mixtures thereof.

25. The process as set forth in claim 24 wherein the polyethers are selected from the group consisting of diglyme, monoglyme, dioxane and mixtures thereof and the hydrocarbons are selected from toluene, pentane and mixtures thereof.

26. The process as set forth in claim 16 wherein the hydride feed comprises solid hydride.

27. The process as set forth in claim 16 wherein the reaction mixture is cooled in at least one of the reaction zones.

28. The process as set forth in claim 16 wherein the reaction vessel includes a baffle which defines a lower reaction zone and an upper reaction zone.

29. The process as set forth in claim 28 wherein the reaction mixture in the upper reaction zone is cooled.

30. The process as set forth in claim 29 wherein the reaction mixture in the lower reaction zone is not cooled.

31. The process as set forth in claim 16 wherein the reaction vessel includes two baffles which define a lower reaction zone, an intermediate reaction zone and an upper reaction zone.

32. The process as set forth in claim 31 wherein the reaction mixtures in the upper reaction zone is cooled.

33. The process as set forth in claim 32 wherein the reaction mixture in the intermediate reaction zone is cooled.

34. The process as set forth in claim 33 wherein the reaction mixture in the lower reaction zone is not cooled.

35. The process as set forth in claim 16 wherein the reaction vessel is cylindrical and the baffles are annular.

36. The process as set forth in claim 16 wherein the conversion of the hydride is at least about 80%.

37. The process as set forth in claim 16 wherein the conversion of the hydride is at least about 99%.

38. The process as set forth in claim 16 wherein the conversion of halosilane is at least about 80%.

39. The process as set forth in claim 16 wherein the conversion of halosilane is at least about 99%.

40. The process as set forth in claim 16 wherein the reaction mixture is agitated by gas-phase bubble action.

41. The process as set forth in claim 16 wherein the hydride is selected from the group consisting of alkali or alkaline earth metal hydrides, alkali or alkaline earth metal salts of aluminum tetrahydride, and combinations thereof.

42. The process as set forth in claim 16 wherein the halosilane is selected from the group consisting of silicon tetrahalide, trihalosilane, dihalosilane, monohalosilane and combination thereof.

43. The process as set forth in claim 16 wherein the hydride is an alkali or alkaline earth metal salts of aluminum tetrahydride, the halosilane is silicon tetrahalide and the halide salt is an alkali or alkaline earth-metal salt of aluminum tetrahalide.

44. The process as set forth in claim 16 wherein the hydride is the sodium salt of aluminum tetrahydride, the halosilane is silicon tetrafluoride and the halide salt is the sodium salt of aluminum tetrafluoride.

45. The process as set forth in claim 16 wherein the discharged effluent is a slurry.

46. The process as set forth in claim 16 wherein the temperature of the reaction mixture within one of the reaction zones is monitored to control the flow rate of at least one of the hydride feed and feed gas.

47. The process as set forth in claim 46 wherein the temperature is compared to a temperature, $T_{100}$, at which 100% conversion is achieved based on the respective reactant flow rates.

48. The process as set forth in claim 16 wherein the difference in temperature between two reaction zones is monitored to control the flow rate of at least one of the hydride feed and feed gas.

49. The process as set forth in claim 48 wherein the temperature difference is compared to a temperature difference, $T_A$, at which 100% conversion is achieved based on the respective reactant flow rates.

* * * * *